United States Patent
Sartain (12)

(10) Patent No.: US 6,194,339 B1
(45) Date of Patent: Feb. 27, 2001

(54) ETHYLENE POLYMERIZATION CATALYST AND CATALYST SYSTEM

(75) Inventor: William J. Sartain, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/442,262

(22) Filed: Nov. 17, 1999

(51) Int. Cl.$^7$ .............................. B01J 21/00; B01J 21/06; B01J 21/08
(52) U.S. Cl. .......................... 502/103; 502/104; 502/114; 502/115; 502/118; 502/125; 502/156; 526/90; 526/126; 526/210
(58) Field of Search ................................. 502/103, 104, 502/114, 115, 118, 125, 156, 172

(56) References Cited

U.S. PATENT DOCUMENTS

| | | | | |
|---|---|---|---|---|
| 4,806,433 | * | 2/1989 | Sasaki et al. | 502/115 |
| 5,106,926 | * | 4/1992 | Eisinger et al. | 526/88 |
| 5,817,724 | * | 10/1998 | Aoki et al. | 526/127 |

FOREIGN PATENT DOCUMENTS 0 595 574  *  4/1994  (FR) ................................. 110/2

OTHER PUBLICATIONS

Noshay et al., "Transition Metal Catalyzed Polymerizations Ziegler–Natta and Metathesis Polymerizations", Cambridge University Press, New York, New York, edited by R.P. Quirk, pp. 396–416, Jun. 1988.*

* cited by examiner

Primary Examiner—Mark L. Bell
Assistant Examiner—Michael J. DiVerdi
(74) Attorney, Agent, or Firm—Shao Cuo

(57) ABSTRACT

An ethylene polymerization catalyst and a catalyst system which provides an ethylene copolymer which, when formed into a film, is characterized by the combination of high stiffness and impact strength. The ethylene polymerization catalyst is formed by contacting a support with an organosilicon compound. The so-treated support is thereupon contacted, in a second step, with a dialkylmagnesium compound or complex. In a third step, the product of the second step is contacted with an alcohol or silane compound. This product, in turn, in a fourth step, is contacted with a transition metal compound. Finally, in a fifth and concluding step, the product of the fourth step is contacted with a Group 13 metal-containing compound. The second and third, as well as the third and fourth contacting steps may be reversed.

12 Claims, 6 Drawing Sheets

ETHYLENE POLYMERIZATION CATALYST AND CATALYST SYSTEM

FIELD OF THE INVENTION

The present invention relates to an ethylene polymerization catalyst which is employed in the polymerization of an ethylene copolymer, and more particularly to an in-situ prepared ethylene copolymer resin which has unique melt elastic properties when the resin is in its reactor-made or pelletized forms. The melt elastic properties observed by the ethylene copolymer resin of the present invention are not found in ethylene copolymers known heretofore, and importantly provide enhanced-impact strength properties to films that are produced therefrom.

The present invention is also directed to a polymerization catalyst.

BACKGROUND OF THE INVENTION

The successful development of linear low density polyethylene (LLDPE) has forever changed the character of the polyethylene industry. For over fifty years, low density polyethylene (LDPE) was produced at pressures ranging up to 345 MPa (50,000 psi) and temperatures of about 300° C. Technology was then developed in subsequent years which was capable of operating at less than 2 MPa (300 psi) and near about 100° C. This technologic development has rapidly established itself as a low cost route to producing LLDPE.

LLDPE, which is typically made using a transition metal catalyst rather than a free-radical catalyst, as required for LDPE, is characterized by linear molecules having no long-chain branching; short-chain branching is instead present and is the primary determinant of resin density. The density of commercially available LLDPE typically ranges from 0.915–0.940 g/cm$^3$. Moreover, commercially available LLDPEs generally exhibit a crystallinity of from about 25–60 vol. %, and a melt index which can range from 0.01 g/10 min. to several hundred g/10 min.

Many commercial LLDPEs are available which contain one or more comonomers such as propylene, 1-butene, 4-methyl-1-pentene, 1-hexene, 1-octene and mixtures thereof. The specific selection of a comonomer for LLDPE is based primarily on process compatibility, cost and product design.

In today's polyethylene industry, LLDPEs are used in a wide variety of applications including film forming, injection molding, rotomolding, and wire and cable fabrication. A principal area for LLDPE copolymers is in film forming applications since such copolymers typically exhibit high dart impact, high Elmendorf tear, high tensile strength and high elongation, in both the machine direction (MD) and the transverse direction (TD), compared with counterpart LDPE resins.

Examples of previous developmental trends in this field include U.S. Pat. Nos. 5,260,245; 5,336,652; and 5,561,091, all to Mink et al., which disclose LLDPE films that exhibit the above properties made from polymerizing ethylene and at least one comonomer in the presence of a polymerization cocatalyst and vastly distinct transition metal catalysts. Specifically, in the '245 patent the transition metal catalyst is formed by treating silica having reactive OH groups with a dialkylmagnesium compound in a solvent; adding to said solvent a carbonyl-containing compound and then treating with a transition metal compound.

In the '652 patent, the transition metal catalyst is prepared by treating a support having a reduced surface OH content with an organomagnesium compound; treating the product with a silane compound having the formula $R_x^1SiR_y^2$ wherein $R^1$ is $R_w$—O where $R_w$ is hydrocarbyl containing 1 to 10 carbon atoms; $R^2$ is halogen, hydrocarbyl having 1 to 10 carbon atoms or hydrogen; x is 1, 2, 3 or 4 and y is 0, 1, 2 or 3 with the proviso that x+y=4, and a transition metal compound. In this reference, reduction of surface OH content of the silica is effectuated by heating or by treatment with an aluminum compound.

The transition metal catalyst employed in the '091 patent is one that is obtained by contacting silica having reactive OH groups with a dialkylmagnesium compound in a solvent; adding a mixture of an alcohol and $SiCl_4$ thereto with subsequent treatment with a transition metal catalyst.

U.S. Pat. No. 4,335,016 to Dombro provides a supported olefin polymerization catalyst which is prepared by (1) forming a mixture of a calcined, finely divided porous support material and an alkyl magnesium compound; (2) heating the mixture for a time and at a temperature sufficient to react the support and the alkyl magnesium compound; (3) reacting, by heating, the product of (2) with a hydrocarbylhydrocarbyloxysilane compound; (4) reacting, by heating, the product of (3) with a titanium compound that contains a halide; or (5) reacting the product of (2) with the reaction product of a hydrocarbylhydrocarbyloxysilane compound and a titanium compound that contains a halide; and (6) activating the catalyst product of (4) or (5) with a cocatalyst comprising hydrogen or an alkyl lithium, alkyl magnesium, alkyl aluminum, alkyl aluminum halide or alkyl zinc.

Crotty et al. "Properties of Superior Strength Hexene Film Resins", Antec, 193, pp. 1210 describes the properties of superior strength hexene copolymer resins that are prepared by the Unipol process. These resins reportedly yield films with exceptional strength properties (impact and tear strength) that are significantly higher than the standard hexene products and even higher than achieved with commercially available octene copolymers. At the same time, the resins show little or no difference in processability from standard LLDPE.

The actual physical structures of polymers and abundant changes to same under various conditions is difficult to measure precisely and is commonly done indirectly. Rheology is often used in this regard, being especially suited to study the physical changes of polymers. Specifically, rheology deals with the deformation and flow of a polymer. Data so generated is used to provide information regarding the processability and even structural characterizations of the polymer.

One rheological method that is typically used is conventional, high shear modification wherein disentanglement of the polymer or copolymer chains occur. If a polymer or copolymer melt is sheared mechanically, the melt may be processed in a less elastic state or possibly less viscous state than the initial resin. Effects of shear modification are typically manifested by changes in die swell, die entrance pressure losses, normal stresses and flow defects such as sharkskin surfaces and melt fracture.

Although shear modification has been observed in LDPE, wherein disentanglement of the long chain branching of the polymer can readily occur, there was contention as to whether LLDPE could be shear modified. The question was answered in an article by The, et al. entitled "Shear Modification of Linear Low Density Polyethylene", Plastics and Rubber Processing and Applications, Vol. 4, No. 2, pg. 157 (1984). In this article, LLDPE was shear modified by preshearing the LLDPE resin under high shear conditions (>3.9 sec$^{-1}$) in an extruder. This study indicated that shear modification of the LLDPE polymer causes disentanglement to occur in the extruder, and that the relatively, disentangled polymer can be restored to a more highly elastic, entangled state by subjecting the melt to annealing or dissolving the shear modified polymer in a solvent.

Another rheological technique employed in the prior art to determine the physical characteristics of a polymer is to measure the polydispersity or melt elasticity, ER, of the polymer melt. This technique is described in an article by R. Shroff, et al. entitled "New Measures of Polydispersity from Rheological Data on Polymer Melts", J. Applied Polymer Science, Vol. 57, pp. 1605–1626 (1995).

Using this Theological technique (ER calculation), prior art ethylene copolymer resins, such as described in The, et al., exhibit conventional melt elastic behavior in both the unsheared pelletized and sheared pelletized states. In the unsheared state, the ER values of prior art ethylene copolymers remain substantially unchanged in going from the powder to pellet form. Moreover, no change in ER is observed in dissolving the pellet in an organic solvent.

As to the shear modified forms, prior art polymers exhibit a decrease in melt elasticity upon shear modification of the pelletized form. This signifies that the entanglement density of the polymer decreases. Upon dissolution of the shear modified form in an organic solvent, an increase in melt elasticity is observed with prior art ethylene copolymers. This increase in melt elasticity signifies a reversion of the polymer back to an entangled state.

In prior art ethylene copolymers, no polymeric networks, i.e. systems of interconnected macromolecular chains, are present. This is verified by the above melt elastic behavior of prior art ethylene copolymers. As is known to those skilled in the art, the presence of network structures in polymers often provides polymers having improved properties. It is emphasized that while network structures are common in styrene-butadiene-styrene (SBS) block copolymers—See F. Morrison, et al., "Flow-Induced Structure and Rheology of a Triblock Copolymer", J. Appl. Polymer Sci., Vol. 33, 1585–1600 (1987)—they are not known in LLDPE resins, until the advent of the present invention.

SUMMARY OF THE INVENTION

The present invention provides an ethylene polymerization catalyst that yields an ethylene copolymer that exhibits unique melt elastic properties that are not present in ethylene copolymers known heretofore. The unique melt elastic properties that are exhibited by the inventive ethylene copolymer are believed to be manifested by the presence of a network structure in the copolymer resin. While not being bound by any theory, it is hypothesized that the network structure in the present ethylene copolymer is formed at least in part of a rubber phase believed present in the copolymer which serves to interconnect the hard and soft phases of the ethylene copolymer.

The presence of a network structure in the ethylene copolymer resin of the present invention is verified by the fact that the copolymer resin exhibits a reactor-made-to-pellet ER increase which is reversible, i.e. reduced, upon rheometric low shear modification. The term "ER" is used herein to measure the elasticity or the polydispersity of the ethylene copolymer which is derived from rheological data on polymer melts, See the article to Shroff, et al. suDra. The term "reactor-made" is used herein to denote powder, slurry or solution forms of the polymer resin which are formed in a polymerization vessel prior to melt processing.

In addition to exhibiting the above melt elastic behavior, the pelletized form of the ethylene copolymer of the present invention exhibits a decrease in melt elasticity when dissolved in an organic solvent such as xylene. The solution dissolution ER value is nearly the same as that of the original reactor-made material.

Specifically, the ethylene copolymer resin of the present invention comprises ethylene, as the major component, and at least one $C_{4-8}$ comonomer with the proviso that the resin, when in pelletized form, has a reduction in melt elasticity (ER) of 10% or more, to a final ER value of 3.0 or less upon rheometric low shear modification or solution dissolution. A 10–30% reduction in ER of the pelletized form of the inventive copolymer resin upon rheometric low shear modification or solution dissolution is typically observed. Moreover, the ethylene copolymer resin of the present invention, when in reactor-made form, exhibits a partially reversible increase of 10% or more in said ER when pelletizing the same.

The term "rheometric low shear modification is used in the present invention to indicate that the modification occurs in a rheometer that is capable of operating at shear rates of less than 1.0 sec$^{-1}$ for a time period of from about 10 to about 60 minutes. This term is thus distinguishable from high shear modification, as disclosed in The, et al., supra, wherein the modification is typically carried out in an extruder, prior to being introduced into a rheometer, at shear rates of 3.9 sec$^{-1}$ and higher.

The term "solution dissolution" is used herein to indicate that the pelletized form of the ethylene copolymer resin can be dissolved in an organic solvent such as xylene. The importance of this technique is that it allows a means for estimating the ER value of the original reactor-made material if the same is not available.

In addition to exhibiting unique melt elastic properties, the ethylene copolymer resin of the present invention is further characterized as having a base polymer density of about 0.930 g/cm$^3$ or less, a melt index of from about 0.01 g/10 min or greater and a rubber content of about 15 vol. % or greater. Moreover, the rubber phase of the ethylene copolymer resin of the present invention contains from about 35 to about 65 alkyl branches per 1000 total carbon atoms.

Another aspect of the present invention relates to a high-impact strength film that can be produced from the ethylene copolymer resin of the present invention. The term "high-impact strength" is used herein to denote an impact strength, as measured using a free-falling dart, of at least about 300 g/mil or higher.

As stated earlier, the polymerization catalyst of the present invention relates to a polymerization catalyst which is capable of producing ethylene copolymers having the unique melt elastic properties mentioned above. In one embodiment of the present invention, the ethylene polymerization catalyst is obtained by:

(a) contacting a support material with an organosilicon compound to effectuate reduction of surface hydroxyl groups present on said support material;

(b) contacting the modified support material with a dialkylmagnesium compound or complex;

(c) contacting the product of (b) with an alcohol or a silane compound; and (d) contacting the product of (c) with a transition metal compound; and (e) contacting the product of (d) with a Group 13 metal-containing compound.

In another embodiment of the present invention, the polymerization catalyst is obtained by:

(a) contacting a support material with an organosilicon compound to effectuate reduction of surface hydroxyl groups present on said support material;

(b) contacting the modified support material with a dialkylmagnesium compound or complex;

(c) contacting the product of (b) with a transition metal compound;

(d) contacting the product of (c) with an alcohol or a silane compound; and (e) contacting the product of (d) with a Group 13 metal-containing compound.

In yet another embodiment, the catalyst of the present invention is obtained by:

(a) contacting a support material with an organosilicon compound to effectuate reduction of surface hydroxyl groups present on said support material;

(b) contacting the modified support material with an alcohol or a silane compound;

(c) contacting the product of (b) with a dialkylmagnesium compound or complex;

(d) contacting the product of (c) with a transition metal compound; and (e) contacting the product of (d) with a Group 13 metal-containing compound.

A still further aspect of the present invention relates to an ethylene polymerization process wherein ethylene and at least one $C_{4-8}$ comonomer are copolymerized in the presence of one of the above-mentioned ethylene polymerization catalysts, a suitable cocatalyst capable of activating the ethylene polymerization catalyst and, optionally, a cocatalyst modifier. This polymerization process results in the production of the inventive ethylene copolymer resin having the unique melt elastic properties described hereinabove.

DETAILED DESCRIPTION OF THE INVENTION

Figure 1:
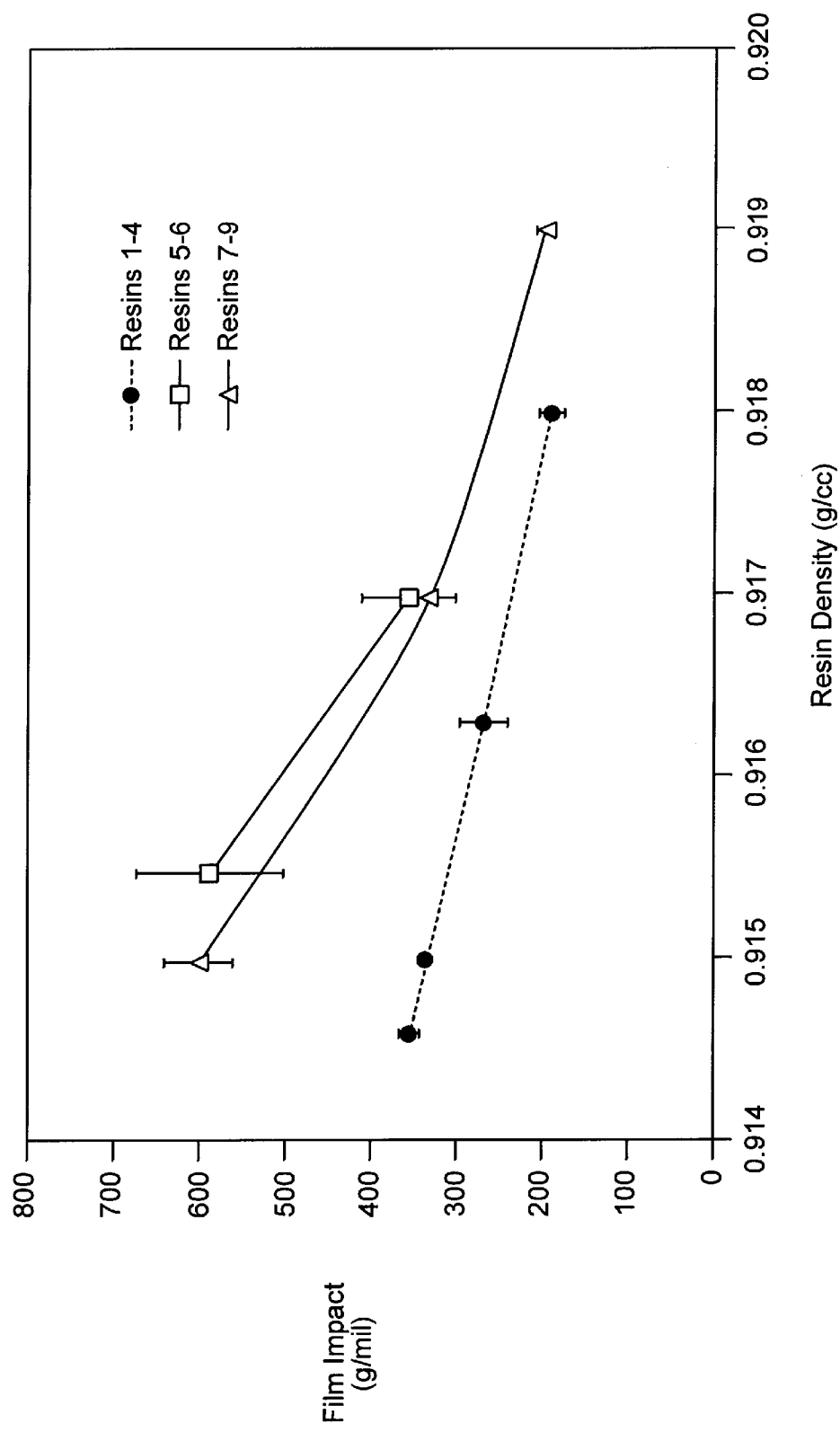
FIG. 1 is a graph of film impact (g/mil) vs. resin density (g/cc) for various catalyst systems.
Figure 2:
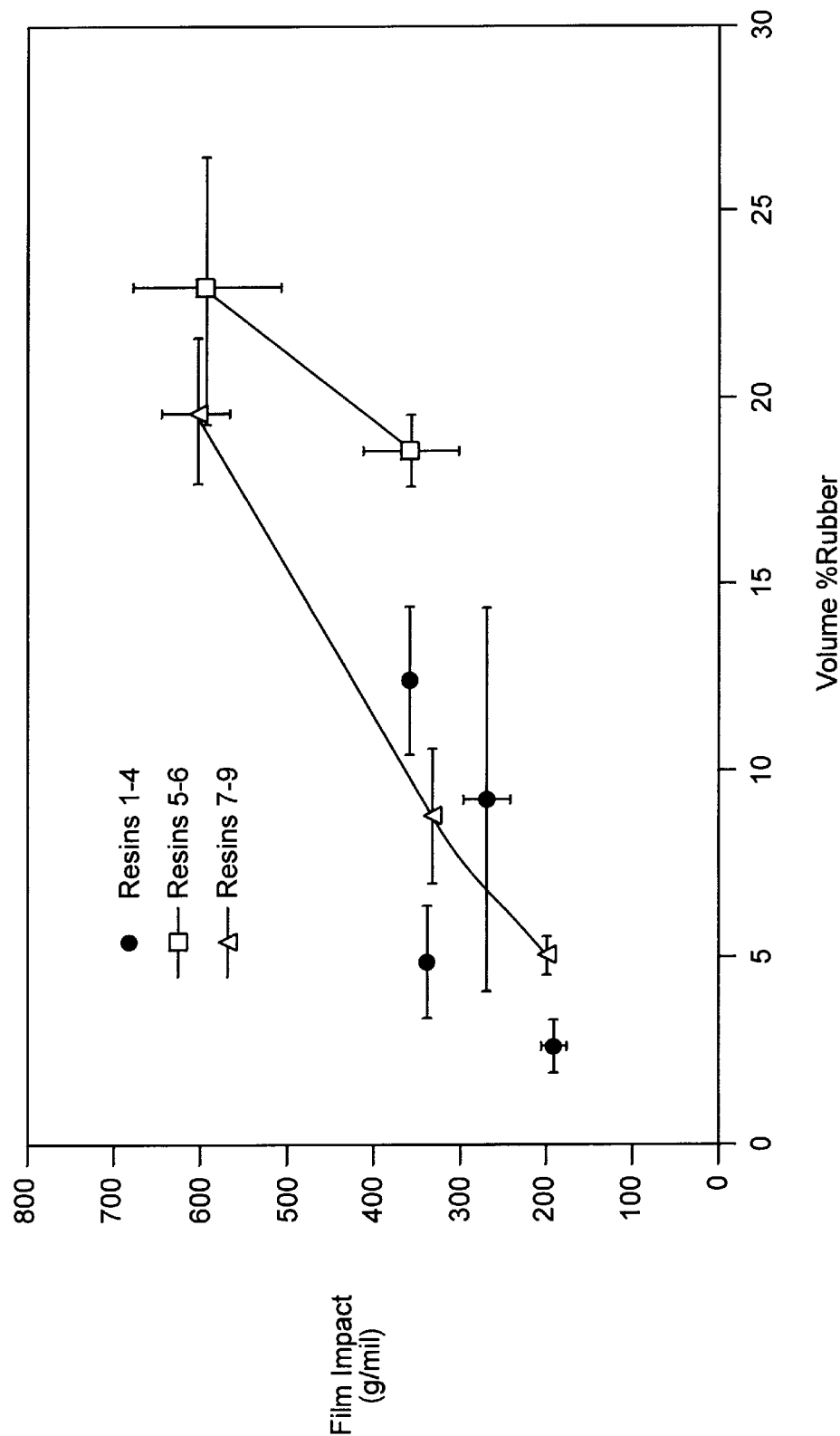
FIG. 2 is a graph of film impact (g/mil) vs. vol. % rubber for various catalyst systems.
Figure 3:
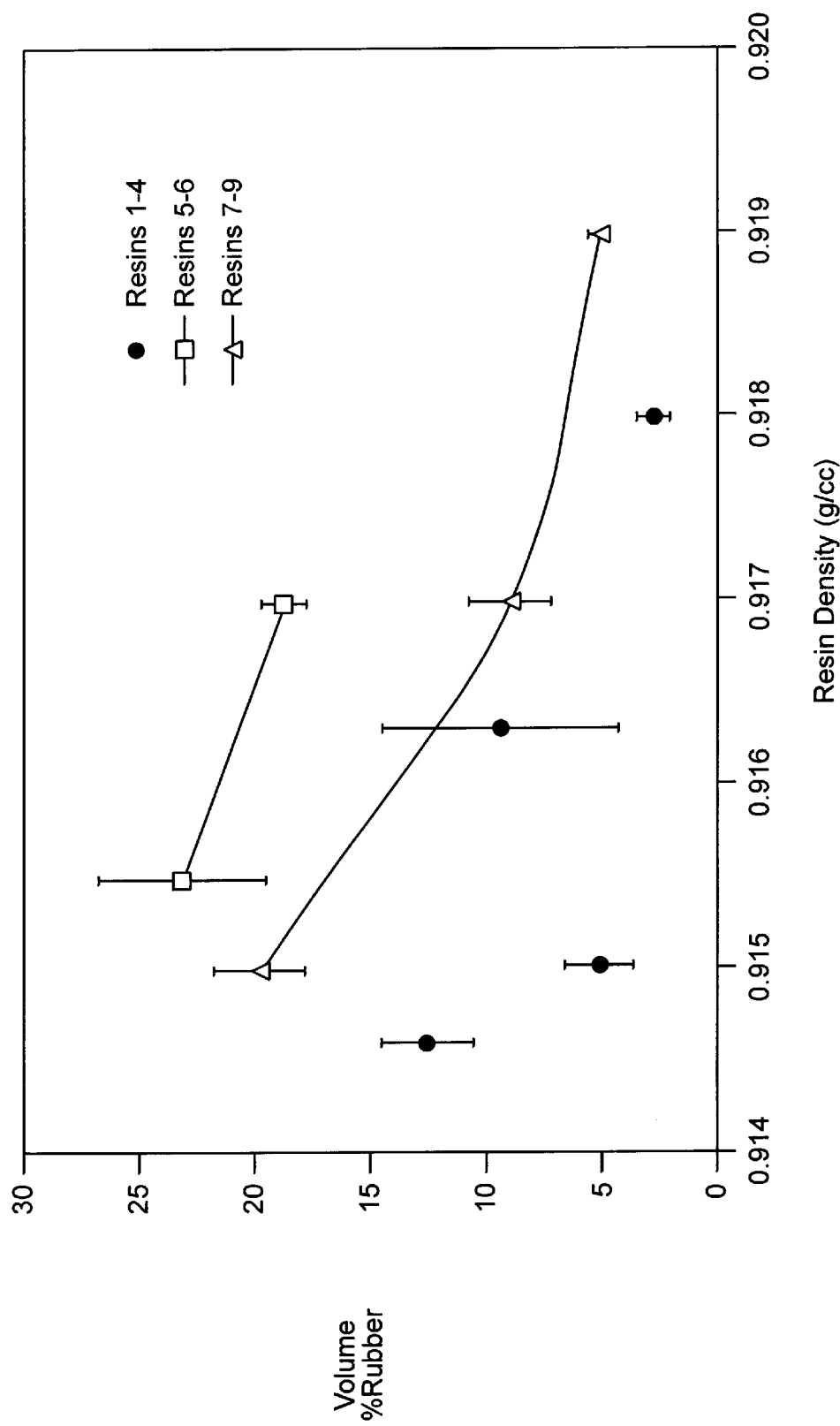
FIG. 3 is a graph of vol. % rubber vs. resin density (g/cc) for various catalyst systems.
Figure 4:
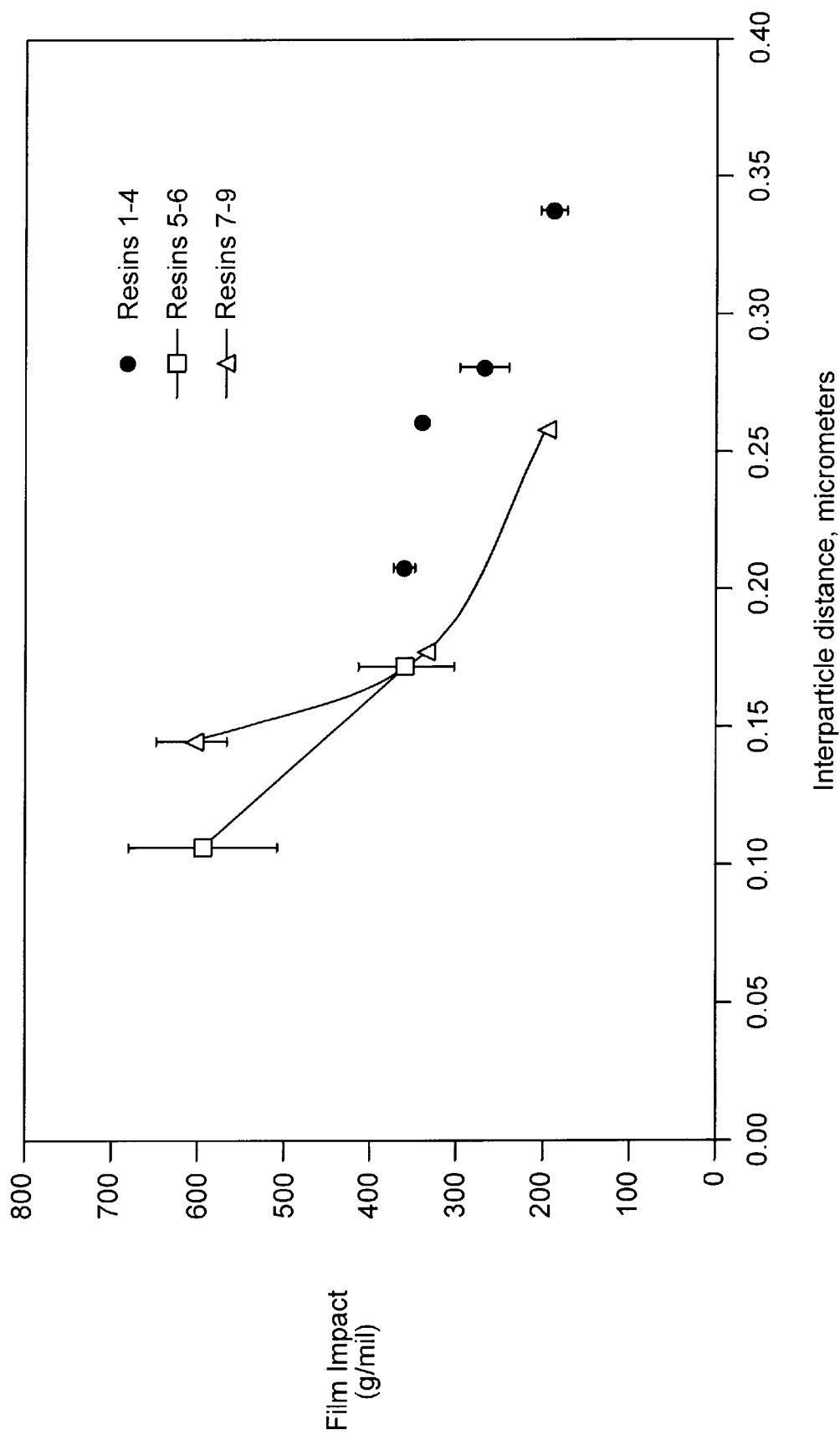
FIG. 4 is a graph of film impact (g/mil) vs. rubber interparticle distance (micrometers).

As stated above, the present invention provides an ethylene copolymer resin which exhibits enhanced film impact when formed into a film, and has unique melt elastic properties which, in part, signify the presence of a network structure in the ethylene copolymer resin of the present invention.

The ethylene copolymer resin of the present invention is characterized as containing ethylene, as the major component, and at least one $C_{4-8}$ comonomer, as a minor component. In accordance with an embodiment of the present invention, it is highly preferred that 1-hexene be used as the comonomer. When 1-hexene is employed as the comonomer, the resin typically contains 95% or less ethylene and the remainder being 1-hexene.

Another characteristic of the ethylene copolymer resin of the present invention is that it has a base copolymer density of about 0.930 g/cm³ or below. The term "base polymer density" represents the density of the polymer resin before the addition of any additives or fillers which are commonly introduced upon processing. More preferably, the base polymer density of the ethylene copolymer resin of the present invention is about 0.925 g/cm³ or below. Most preferably, the base polymer density is about 0.922 g/cm³ or below. The above density ranges qualify the ethylene copolymer resin of the present invention as LLDPE.

In addition to the above characteristics, the ethylene copolymer resin of the present invention also contains a network structure which is believed, but not entirely known, to be formed at least in part by a rubber phase known to be present in the inventive ethylene copolymer resin. The rubber phase is characterized as being an ethylene/comonomer rubber which is highly branched, i.e. it contains from about 35 to about 65 alkyl branches per 1000 total carbon atoms. The network structure is believed to interconnect the hard and soft phases of the inventive copolymer resin thereby partly providing the ethylene copolymer resin of the present invention with its unusual and totally unexpected melt elastic properties.

In one embodiment of the present invention, the ethylene copolymer resin contains about 15 vol. % or greater of a rubber phase, as measured by a technique known as Scanning Electron Microscopy (SEM) which is described, for example, in an article to F. Mirabella, et al. entitled "Morphological Explanation of the Extraordinary Fracture Toughness of Linear Low Density Polyethylenes", J. Polymer Science: Part B: Polymer Physics, Vol. 26, No. 9, August 1988, pp. 1995–2005. Specifically, the following procedure was employed in the present invention to determine the vol. % rubber in the copolymer resin: A compression-molded sample was microtomed at a specimen temperature of about −80° C. in an LKB Ultratome V with Cryokit. The bulk specimen thus prepared was etched in n-heptane at 60° C. for 20 minutes in a sonic bath, mounted onto a scanning electron microscope specimen stub, and sputter coated with approximately 200 Å of gold. The specimen was then analyzed in an ISI-40 SEM. This procedure removes any rubbery, amorphous or low-crystallinity, in the resin from the specimen surface and leaves definable cavities where the material was originally located. Photomicrographs were statistically analyzed with a Ziess Videoplan Image Analyzer.

In one embodiment of the present invention, the rubber particles present in the ethylene copolymer resin of the present invention have an average radius, $R_w$, of about 0.05 to about 0.25 micrometers. The interparticle distance of the rubber particles in the rubber phase is determined using the following equation:

$$\text{Interparticle distance} = 2R_W\left[\left(\frac{\pi}{6\phi}\right)^{1/3} - 1\right]$$

where $R_w$ is the average particle radius and $\phi$ is the volume fraction (vol. % rubber/100), See S. Wu "Phase Structure and Adhesion in Polymer Blends: A Criterion for Rubber Toughening", Polymer, Vol. 26, pp. 1855 (1985). In one embodiment of the present invention, the rubber particles typically have an interparticle distance of 0.20 micrometers or less.

The ethylene copolymer resin of the present invention is further characterized as having a melt index of from about 0.01 g/10 min. or greater. More preferably, the ethylene copolymer resin of the present invention has a melt index of from about 0.5 to about 4.0 g/10 min.

Although various of the above resin properties may be known in the art, the unique melt elastic properties defined hereinbelow are not. It is this characteristic of the inventive ethylene copolymer resin which distinguishes same from all previously known ethylene copolymers.

Specifically, the ethylene copolymer resin of the present invention, when in reactor-made form, has a ER value of 0.9 or below, which undergoes an increase in ER when pelletizing the reactor-made material. That is, when the original reactor-made form, i.e. powder, solution or slurry, of the ethylene copolymer resin of the present invention is made into a pellet one observes a positive %ER shift. An increase from about 10 to about 80% in ER is typically observed when comparing the reactor-made material to the pellet. However, such an increase is reversible. That is, the pellet's ER value can be reduced upon rheometric low shear modification or solution dissolution. This characteristic is distinct from irreversible increase in ER observed, for example, due to polymer degradation (chain extension and/or long chain branching formation).

In addition to the above melt elastic property, the ethylene copolymer resin of the present invention, when in pelletized form, exhibits a reduction in ER to values below 1.0 after subjecting the same to rheometric low shear modification or solution dissolution. A 10–30% reduction in ER of the pelletized form of the invention copolymer resin is typically observed. This reduction in ER of the pelletized sample under rheometric low shear modification or solution dissolution signifies that the ER shift observed is reversible.

The following techniques were employed in the present invention to obtain Theological data of the ethylene copolymer resin of the present invention.

I. Xylene Dissolution Experiments: 2 grams of polymer were dissolved into 200 ml of xylene at 110° C. for about 1 hr. The resultant solution was allowed to cool at room temperature. The xylene solvent was allowed to slowly evaporate (typically over a period of 4–5 days).

The polymer sample was recovered and dried in vacuum at 60° C. for about 72 hours. The dried sample was then pressed into 25 mm disks for Theological measurements as described hereinbelow.

II. Sample Preparation for Rheological Measurements: Measurement of polymer melt Theological properties were carried out in a Rheometric ARES rheometer using 25 mm disk samples having a thickness of about 1.2 mm. The disk samples were prepared by pre-pressing (pellet or powder, as necessary) using a compression press and a brass 1.2 mm template with 1 inch holes sandwiched between two ¼ inch steel plates with a sheet of mylar film placed between the press template and steel plates. About 2–3 wt. % antioxidant (50% BHT-50% Irganox 1010) was added during disk pressing for extra stabilization. The compression press was maintained at 150° C.

For polymers exhibiting powder-to-pellet changes in rheology, it is imperative to minimize flow and mixing during sample preparation. For example, pressing disks out of a polymer powder and then re-melting and repressing the same disks may increase the measured ER.

III. Rheological Measurements for ER Calculation: A standard practice for measuring,dynamic rheology data in the frequency sweep mode, as described in ASTM 4440–95a, was employed herein. A Rheometrics ARES rheometer was used, operating at 150° C., in the parallel plate mode in a nitrogen environment (in order to minimize sample oxidation/degradation). The gap in the parallel plate geometry was typically 1.2–1.4 mm and the strain amplitude was 10–20%, preferably 10% strain amplitude was employed. The range of frequencies was 0.0251 to 398.1 rad/sec.

As disclosed in Shroff, et al. supra and U.S. Pat. No. 5,534,472 (See Col. 10, lines 20–30), ER is calculated from the storage modulus (G') and loss modulus (G") data, as follows: the nine lowest frequency points are used (5 points per frequency decade) and a linear equation is fitted by least-squares regression to log G' versus log G". ER is then calculated from the following equation:

$$ER = (1.781 \times 10^{-3}) x G', \text{ at a value of } G''=5000 \text{dyn/cm}^2.$$

It is understandable to those skilled in the art that non-linearity in the log G' versus log G" plot will result in different ER values depending on the range of the data employed, which in turns relates to the range in frequency data. The procedure followed was to extend the lower end of the frequency range so that the lowermost G" value was within the range of $7 \times 10^3$–$10^4$ dyn/cm$^2$. Practically speaking, this requires a lowermost frequency of 0.0398 rad/sec for 1 MI LLDPEs and 0.0251 rad/sec for 0.6 MI LLDPEs, at 150° C.

IV. Rheometric Shear Modification: A sample was placed in the AERS rheometer and a standard frequency sweep was performed. Then, a steady preshearing was applied by specifying the shear rate and time of pre-shearing. Typically, the shear rate was 0.1 sec$^{-1}$ and the time was 20–60 minutes. Preshearing was applied by specifying the rotational speed of the moving plate in the Rheometrics ARES rheometer. A rotational speed of about 0.01 rad/sec will result in a shear rate of 0.1 sec$^{-1}$ for a 1.25 mm gap and 25 mm plates. At the end of preshearing, a standard frequency sweep was performed. Comparison of the rheometric data before and after rheometric shear modification and calculation/comparison of ER calculated from each, will show and quantify whether the polymer exhibits rheometric shear modifiability.

The above provides a description of the ethylene copolymer resin of the present invention, the description that follows is directed to the polymerization catalyst, polymerization process and film. The ethylene copolymer resin of the present invention is prepared in-situ by polymerizing ethylene and at least one $C_4$–$C_8$ comonomer in the presence of an ethylene polymerization catalyst, a cocatalyst, and an optional cocatalyst modifier, under ethylene polymerization conditions. Mechanical blends of ethylene and various comonomers and/or copolymers such as ethylene propylene rubber (EPR) fall outside the realm of the present invention since they are not prepared in-situ.

In one embodiment, the ethylene polymerization catalyst of the present invention is preferably prepared by contacting a chemically treated support material with a dialkylmagnesium compound or complex, contacting the magnesium-containing support material with either an alcohol or a hydrocarbyloxyhydrocarbylsilane and thereafter with a transition metal compound. It is again emphasized that when an alcohol is used, a hydrocarbyl alkoxysilane cocatalyst modifier is required.

Suitable support materials that may be employed in the present invention include: inorganic supports such as silica, alumina, aluminum phosphate, celite, magnesium oxide, iron oxide and organic supports including polymers and copolymers.

A preferred support material is silica. When silica is employed as the support material, it preferably pure, however, the silica may contain minor amounts of other inorganic oxides. In general, the silica support comprises at least 90–95% by weight pure silica. In a preferred embodiment, the silica is at least 99% pure.

The silica support utilized in the present invention has a surface area of from about 50 to about 500 m²/g; a particle size of from about 10 to about 200 micrometers; and a pore volume of about 0.5 to about 3.0 cc/g as determined by standard B.E.T. measurements.

Another particularly preferred support material is celite. Celite is a diatomaceous earth composition composed of approximately 4% alumina, approximately 90% silica and the remainder calcium oxide and other inorganic oxides. Celite, commercially available from Eagle-Picher Minerals, Inc., has a porosity of between about 50 to about 90 volume %; a pore volume of between about 2.4 to about 3.5 cc/g; and a surface area of between about 2 to about 100 m²/g.

The aluminum phosphate, when employed as the support, has a preferred pore volume of between about 0.7 to about 1.25 cc/g and a preferred surface area of about 200 to about 350 m2/g. To obtain these preferred physical characteristics, it is preferred that the aluminum phosphate be made more amorphous than pure aluminum phosphate. Thus, AlPO$_4$ is synthesized with other agents such that the atomic ratio of phosphorus to aluminum be in the range of between about 0.70 and about 0.95. More preferably, this atomic ratio is in the range of between about 0.72 and about 0.85.

The alumina employed for use as the support is characterized by a pore volume of between about 0.8 to about 3 cc/g and a surface area of about 300 m²/g to about 400 m²/g.

Prior to contact with the organomagnesium compound or complex, the support material is contacted with an organosilicon compound, such as disclosed in U.S. Pat. Nos. 4,374,753 and 4,530,913 both to Pullukat, et al., the contents of each being incorporated herein by reference, to reduce the number of surface hydroxyl groups. Typically, about 0.3 to about 1.2 mmol of OH groups remain after this chemical treatment step. It is noted that calcination alone or chemical treatment of a support material with an aluminum compound does not provide a polymerization catalyst which exhibits high activity and yield yet is capable of providing ethylene copolymers having all of the above mentioned characteristics.

Suitable organosilicon compounds that can be employed in the present invention to treat the support material are those having one of the following formulas: $(R_3^4Si)_2NH$, $R_3^4Si(OR^4)$, $R_3^4SiX^4$ and $(R_3^4Si)_2O$ wherein $R^4$is alkyl or aryl, preferably each containing 1 to 20 carbon atoms, and $X^4$ is a halogen. Specific examples of such organosilicon compounds are hexaalkyl disilazane, trialkylsilyl ethoxide and alkyl chlorosilanes. Of these, hexaalkyl disilazanes are particularly useful in this application, with hexamethyl disilazane, i.e. HMDS, being highly preferred.

After chemically treating the support material with an organosilicon compound, the chemically modified support is optionally dried by calcining the same in an inert atmosphere at a temperature of at least 50° C. More specifically, the calcining step is carried out at a temperature of from about 150° to about 650° C. in nitrogen or argon. The chemically treated support may optionally be dried by vacuum.

The chemically treated support material is then slurried in a hydrocarbon solvent, e.g. heptane or hexane, and thereafter treated with a dialkylmagnesium compound or complex having one of the following formulas:

or

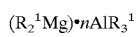

wherein R and R¹ are the same or different and each is independently an alkyl containing from 1 to 12 carbon atoms and n is from 0.5 to 10. Of the compounds that satisfy the above formula, dibutylmagnesium sold by FMC Corporation, butylethylmagnesium and a complex of dibutylmagnesium and triethylaluminum sold by Akzo Chemicals under the tradename MAGALA are highly preferred.

The amount of organomagnesium compound or complex added to the chemically treated support material is from about 0.01 to about 10 mmole per gram support material. More preferably, the amount of organomagnesium compound or complex added in making the ethylene polymerization catalyst of the present invention is from about 0.5 to about 1 mmole per gram support material.

The contact between the organomagnesium compound or complex and treated support material usually occurs at a temperature range of between about 15° to about 120° C. for a time period of from about 5 to about 180 minutes. Preferably, this contact occurs at a temperature of from about 20° to about 40° C. for a time period of from about 30 to about 60 minutes.

To this contact product is added either an alcohol or a silane compound. When an alcohol is employed, aliphatic or aromatic alcohols containing from 1 to 12 carbon atoms can be employed. For a complete description of this embodiment of the present invention, applicants refer to U.S. Pat. No. 4,374,753 to Pullukat, et al. which was previously incorporated herein by reference. In a preferred embodiment of the present invention, the alcohol is an aliphatic alcohol containing 1 to 5 carbon atoms. Of these preferred alcohols, n-butanol, i.e. butyl alcohol, is most preferred. The amount of alcohol added to the organomagnesium-containing support reaction mixture is from about 0.1 to about 10 mmole per gram support material. More preferably, the concentration range of added alcohol is from about 0.4 to about 1.0 mmole per gram support material.

The silane compound that can be employed in the present invention has the following formula:

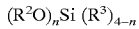

wherein $R^2$ and $R^3$ may be the same or different and are $C_1$–$C_{20}$ alkyl, cycloalkyl, aryl, alkaryl or aralkyl radicals, and n is from 1 to 4. Suitable compounds include: ethoxytrimethylsilane, diethoxydimethylsilane, triethoxymethylsilane, tetraethoxysilane (TEOS), diisopropyldimethoxysilane (DIPS), tetrabutoxysilane (TBOS), methoxytriphenylsilane, methyltriethoxysilane (MTEOS) and phenoxytrimethylsilane. Of these compounds, it is preferred to employ TEOS or TBOS as the hydrocarbyloxyhydrocarbylsilane.

The silane compound is added in an amount of from about 0.05 to about 10 mmole per gram support, with from about 0.1 to about 1 mmole per gram support being highly preferred.

The contact step between the organomagnesium-containing support contact reaction mixture and the alcohol or silane compound usually occurs at a temperature range of from about 15° to about 120° C. for a time period of from about 5 to about 180 minutes. More preferably, this contact occurs at a temperature of from about 20° to about 40° C. for a time period of from about 30 to about 60 minutes.

The above contact product is then contacted with at least one transition metal compound belonging to Groups IVB and/or VB of the Periodic Table of Elements. The transition metal compounds belonging to Group IVB of the Periodic Table of Elements have the structure formula M'x$_p$(OR') wherein M' is titanium or zirconium; R' is aryl, alkyl, aralkyl, cycloalkyl or alkylsilyl; X is a halogen; p is 0 or an integer from 1 to 4; and q is 0 or an integer from 1 to 4; with the proviso that the sum of p and q is 4. It is especially preferred that M' be titanium.

In a preferred embodiment, the titanium-containing compound is one wherein p is an integer from 2 to 4 and q is 0 or an integer 1 or 2. Suitable titanium compounds within the contemplation of this embodiment are titanium tetrachloride, titanium tetrabromide, methoxytitanium trichloride, ethoxytitanium trichloride, diethoxytitanium dichloride and the like.

Still, more preferably, the titanium-containing compound is defined by p being 4, q being 0, and X is chlorine or bromine. Thus, the titanium compound is most preferably titanium tetrachloride or titanium tetrabromide. Of these two titanium compounds, titanium tetrachloride is most preferred.

Suitable transition metal compounds belonging to Group VB are compounds that have the structural formula $M''(OR'')_x(O)_y(X^2)_z$ wherein M'' is a metal of Group VB of the Periodic Table of Elements, R'' is a hydrocarbyl having from 1 to 18 carbon atoms; $X^2$ is halogen; x is 0 or an integer from 1 to 5; y is 0 or 1; and z=(5−x−2y) or 4 or 3 when x=0, y=0. It is especially preferred that MN' be vanadium.

Suitable vanadium compounds encompassed by the above formula include: vanadium oxyhalides, vanadium alkoxides, vanadium carboxylates, vanadium halides and mixtures thereof. It is especially preferred that the vanadium-containing compound be vanadium tributyloxy, triisobutyl vanadate, vanadium tetrachloride and the like.

This contact between the transition metal-containing compound and the modified organomagnesium-containing support contact product occurs at a temperature from about 15° to about 120° C. More preferably, the temperature of this contacting step is from about 20° to about 40° C. The time employed for contacting with the transition metal-containing compound is at least about 5 minutes. Most preferably, the time of this contacting step is from about 30 to about 60 minutes.

The concentration range of transition metal-containing compound employed in the present invention is from about 0.1 to about 10 mmole transition metal compound per gram support. More preferably, the concentration of transition metal compound used in this contacting step is from about 0.5 to about 1.0 mmole transition metal compound per gram support.

In another preferred embodiment the ethylene polymerization catalyst of the present invention is prepared by the above described steps but includes, as a concluding contacting step, contact with a Group 13 metal-containing compound. Preferably, the Group 13 metal-containing compound has the structural formula $MR^4R^5R^6$, where M is a Group 13 metal; and $R^4$, $R^5$, and $R^6$ are the same or different and are $C_1$–$C_{20}$ hydrocarbyl or halogen, with the proviso that at least one of $R^4$, $R^5$, and $R^6$ is $C_1$–$C_{20}$ hydrocarbyl.

More preferably, M is aluminum or boron; and $R^4$, $R^5$ and $R^6$ are the same or different and are $C_1$–$C_{20}$ alkyl, $C_5$–$C_{20}$ cycloalkyl, $C_6$–$C_{18}$ aryl $C_7$–$C_{20}$ aralkyl, $C_7$–$C_{20}$ alkaryl, chlorine or bromine, with the proviso that at least one of $R^4$, $R^5$ and $R^6$ is not chlorine or bromine.

Still more preferably, $R^4$, $R^5$, and $R^6$ are the same or different and are $C_1$–$C_{10}$. alkyl, chlorine or bromine with the proviso that at least one of $R^4$, $R^5$, and $R^6$ is $C_1$–$C_{10}$ alkyl.

Even still more preferable, $R^4$, $R^5$ and $R^6$ are the same or different and are $C_1$–$C_6$ alkyl or chlorine, with the proviso that at least one of $R^4$, $R^5$ and $R^6$ is $C_1$–$C_6$ alkyl.

Yet even still more preferably, $R^4$, $R^5$ and $R^6$ are the same or different and are $C_2$–$C_4$ alkyl or chlorine with the proviso that at least one of $R^4$, $R^5$ and $R^6$ is $C_2$–$C_4$ alkyl.

Among the preferred compounds within the contemplation of the Group 13 metal-containing compounds are triethylborane, diethylaluminum chloride, ethylaluminum dichloride and ethylaluminum sesquichloride. The last named compound is a preformulated compound obtained by combining diethylaluminum chloride and ethylaluminum dichloride.

The step of contacting the Group 13 metal-containing compound with the supported product of the earlier steps involves providing the Group 13 metal-containing compound in an amount of between about 0.05 mmole and about 50 mmole per gram of support. More preferably, between about 0.1 mmole and about 30 mmole of the Group 13 metal-containing compound is added per gram of support.

The contacting step between the Group 13 metal-containing compound and the supported product of the earlier steps occurs at a temperature in the range of between about 15° C. and about 120° C. over a period of between about 5 minutes and about 3 hours. More preferably, this contacting step occurs at a temperature of between about 20° C. and about 40° C. over a period of between about 30 minutes and about 1 hour.

It should be noted that the above order of addition represents one embodiment for preparing the polymerization catalyst of the present invention. It is also within the contemplation of the present invention to change the order of addition so that the alcohol or silane compound is added after contact with the transition metal-containing compound. In that embodiment of the present invention, the reaction sequence would be It should be appreciated that all the treatment steps in the formation of the ethylene polymerization catalyst of this invention, the contact of support with the organomagnesium compound or complex, the alcohol or silane, the transition metal compound and the Group 13 metal-containing compound, involve contact between a solid, a support material, and a liquid. This is because each of the compounds that are contacted with the support material are liquids, or are soluble in an inert hydrocarbon solvent under the conditions employed by the present process. As such, no ball-milling or other solid mixing is required. Ball-milling is an expensive and difficult operation typically used in the formation of polymerization catalysts of the prior art. Those skilled in the art are aware, in the case where a hydrocarbon is employed, that the solvent may be allowed to remain with the reaction mass or can be removed by decantation, filtration, evaporation, or the like.

The cocatalysts employed by the present invention in activating the ethylene polymerization catalyst are conventional aluminum-containing compounds well known in the art. The aluminum-containing, cocatalysts are preferably alkylaluminum-containing compounds. Alkylaluminum-containing compounds suitable for the present process include trialkylaluminum, alkylaluminum halide, alkylaluminum hydride, aluminoxane (either cyclic or linear) or mixtures thereof. More preferably, the cocatalyst is a trialkylaluminum compound. Of the trialkylaluminum compounds, triethylaluminum (TEAL) is particularly preferred.

The molar ratio of aluminum-containing cocatalyst to transition metal in the solid catalyst is from about 0.01 to about 500. More preferably, the molar ratio of cocatalyst to transition metal in said solid catalyst is from about 10 to about 120.

The cocatalyst modifiers that may be optionally employed by the present invention are hydrocarbyl alkoxysilanes. It is again emphasized that when an alcohol is employed in preparing the polymerization catalyst the cocatalyst modifier is not optional. Rather it is required in that embodiment of the present invention. Preferred hydrocarbyl alkoxysilanes include: hydrocarbyl trialkoxysilanes, dihydrocarbyl dialkoxysilanes and trihydrocarbyl alkoxysilanes. Of the hydrocarbyl trialkoxysilanes, diisopropyldimethoxysilane (DIPS) is highly preferred.

When a cocatalyst modifier is employed, the molar ratio of said cocatalyst modifier to transition metal in said solid catalyst is from about 0.01 to about 100. More preferably, the molar ratio of cocatalyst modifier to transition metal in said solid catalyst employed is from about 0.1 to about 10.

The polymerization process can be conducted in either the gas phase (stirred or fluidized bed) or solution phase. When gas phase polymerization is employed, a single or multiple reactor connected in parallel or series may be employed. The conditions of gas phase polymerization employed in the present invention include any that have heretofore been utilized. Examples of suitable conditions for operating in the gas phase that can be employed herein are disclosed, for example, in U.S. Pat. No. 5,258,345 to Kissin, et al., the contents of which are being incorporated herein by reference.

When solution polymerization is employed, the polymerization is carried out in a liquid organic medium in which the solid ethylene polymerization catalyst is suspended using any slurry polymerization conditions heretofore utilized. A pressure sufficient to maintain the organic diluent and at least a portion of the comonomer in the liquid phase is maintained. Examples of typical operating conditions for slurry polymerization that can be employed herein are described in EPO 848 021 A2, the contents of which are being incorporated herein by reference.

The above ethylene polymerization catalyst and polymerization process provide the ethylene copolymer resin having the above-described unique melt elastic properties. Hence, the ethylene copolymer resin has all of the properties mentioned hereinabove which include having a density of 0.930 cc/g or lower and having a network structure. Moreover, the ethylene copolymer resin exhibits the unique melt elastic properties mentioned hereinabove. Such melt elastic properties distinguish the inventive copolymer resin from any commercially known copolymer since the same do not exhibit the above-mentioned melt elastic properties.

Another aspect of the present invention relates to a high-impact strength film that can be produced from the ethylene copolymer resin of the present invention. Specifically, the high-impact strength film is formed from the pellet of the ethylene copolymer resin of the present invention, and it exhibits improvement in film properties and/or processability. Specifically, the film of the present invention exhibits a dart impact strength of greater than about 300 g/mil and a MD tear of greater than about 300 g/mil. In one embodiment of the present invention, the film has a dart impact strength greater than about 350 g/mil and a modulus of elasticity of from about 20 to about 35 Ksi.

The film is formed in the present invention using a single layer blown film extrusion line which operates under the following conditions:

1 mil, 2.5 Blow-up-ratio, 150 lb/hr, 8 inch die, 100 mil die gap, dual lip air ring, 16 inch frostline height, 420° F. melt temperature, 3.5 inch extruder with a barrier screw and a Maddock mixing section.

The resin and film properties are determined using standard ASTM procedures. Specifically, the following ASTM procedures are used in the present invention:

| | |
|---|---|
| Melt Index | D-1238 |
| Density | D-2389 |
| Film Impact/Free Falling Dart | D-1709 |
| MD-Tear | D-1922 |
| Modulus of Elasticity, 1% secant | D-882 |

The following examples are given to illustrate the scope of this invention. Because these examples are given for illustrative purposes only, the present invention should not be limited thereto.

The catalysts were prepared in a three-neck round bottom flask with a paddle type stirrer. All glassware was oven dried and assembled hot under a nitrogen purge. The left and right joints were fitted, respectively, with a nitrogen source and a vent to a mineral oil bubbler. The vent was also used to add the ingredients and to remove the finished catalyst. The glassware was purged 1 hr. prior to starting the catalyst synthesis. Typically, 4 to 8 grams of HMDS treated silica was added to the flask followed by about 8 ml of heptane/gram of silica and the slurry was stirred at about 160 rpm. The appropriate amount of dialkyl magnesium in heptane was added by syringe. After 30 minutes, the appropriate amount of silane in heptane was added. After 30 minutes, the appropriate amount of $TiCl_4$ in heptane was added. After 30 minutes the heptane was distilled off with a sweep of $N_2$ at 100° C.

Catalysts 1–12 were prepared on Davison 948 silica and dried at 100° C.

Catalysts 1–9, 11 and 12 were prepared with dibutylmagnesium (DBM).

Catalysts 1–6, 10–13, were prepared with $Si(OEt)_4$(TEOS).

Catalysts 7 and 8 prepared with $MeSi(OEt)_3$(MTEOS).

Catalyst 9 prepared with $(isopropyl)_2Si(OME)_2$(DIPS).

Catalysts 10, 13, and 14 were prepared with butylethylmagnesium (BEM).

Catalyst 11 addition order was $Si(OEt)_4$, dibutylmagnesium, and $TiCl_4$.

Catalysts 13 and 14 were prepared on Davison XPO silica and dried at 85° C.

Catalyst 14 prepared with $Si(OBu)$ 4 (TBOS).

| Catalyst | Amount of Mg | Amount of Si | Amount of $TiCl_4$ |
|---|---|---|---|
| 1 | .65 DBM | .16 TEOS | .65 |
| 2 | .65 DBM | .16 TEOS | .65 |
| 3 | .90 DBM | .23 TEOS | .90 |
| 4 | .90 DBM | .10 TEOS | .90 |
| 5 | .40 DBM | .10 TEOS | .40 |
| 6 | .65 DBM | .16 TEOS | .65 |
| 7 | .70 DBM | .40 MTEOS | 1.0 |
| 8 | 1.0 DBM | 1.0 MTEOS | 1.0 |
| 9 | .50 DBM | .12 DIPS | .50 |
| 10 | .50 BEM | .12 TEOS | .50 |
| 11 | .50 DBM | .12 TEOS | .50 |
| 12 | .50 DBM | .12 TEOS | .50 |
| 13 | .50 BEM | .12 TEOS | .50 |
| 14 | .50 BEM | .12 TEOS | .50 |

Bench Scale Polymerization

The reactor used was a 3.3 liter vessel with a helical agitator, thermocouple, and a valve for removing the resultant polymer. The jacket contained water which was recirculated for temperature control at 82° C. 1.5 ml of 25% triethylaluminum in heptane was added by syringe to the seed bed. The catalyst was added to the polymer bed through a polyethylene tube. The agitator was started and 163 psi of $N_2$ was added to the reactor. Next, 18.9 psi of hydrogen was added to the reactor; and thereafter 80 ml of hexene was added to the reactor. Ethylene was then added to give 300 psi reactor pressure. A mixture of 12 wt % hexene in ethylene was fed into the reactor to maintain 300 psi on the reactor. When the total ethylene feed reached about 400 grams, the ethylene feed was stopped and the reactor was cooled and vented. About 448 grams of polymer was drained out of the reactor and the polymerization was repeated three more times to remove the original seed bed. The fourth batch of polymer that was drained from the reactor was submitted for testing.

For inventive catalysts 1–6 (see Table 1) it can be seen that the inventive catalysts show good activity, good comonomer response, good bulk density and produce polyethylene narrow molecular weight distributions.

Bench Scale Slurry Polymerizations with Hexene:

Polymerizations were carried out in a 1 gallon Autoclave Engineering® reactor at 80° C. and 300 psi. After purging the reactor with nitrogen, 400 ml of hexene was added and hydrogen was added as a 250 psi pressure differential from a 300 cc vessel. About 0.7 liter of isobutane was added and the stirrer was started. Ethylene was added to give a total reactor pressure of 260 psi. 1.92 ml of 1.56 M triethylaluminum in heptane was flushed into the reactor with about 200 ml of isobutane. After 1 minute, the catalyst was flushed into the reactor with 200 ml of isobutane to give a total isobutane volume of 1.1 liters. Ethylene was allowed to feed into the reactor to maintain 300 psi. The reaction was terminated by stopping the ethylene feed and venting the reactor. Reactivities were calculated based on grams polymer recovered in one hour/grams of catalyst weight. Melt index (MI, grams/10 minutes) and high load melt index (HLMI, grams/10 minutes) measurements were made using ASTM method D1238–86.

Comparison of catalysts 7, 8, 9 and 12 (see Table 1) show that several other alkoxy silane compounds can be used in the inventive catalysts. TEOS, MTEOS and DIPS show narrow molecular weight distributions. Comparison of catalysts 11 and 12 show that the addition order is unimportant and both catalysts show good reactivity and narrow molecular weight distributions. Comparison of catalysts 10 and 12 show that the exact dialkylmagnesium compound is unimportant and both catalysts using different magnesium compounds show good reactivity and narrow molecular weight distributions.

Bench-scale Slurry Polymerizations with Butene:

Polymerizations were carried out in a 1 gallon Autoclave Engineering® reactor at 75° C. and 335 psi. After purging the reactor with nitrogen, 200 ml of butene was added and hydrogen was added as a 200 psi pressure differential from a 300 cc vessel. About 1.0 liter of isobutane was added and the stirrer was started. Ethylene was added to give a total reactor pressure of 300 psi. 1.92 ml of 1.56 M triethylaluminum in heptane was flushed into the reactor with about 150 ml of isobutane. After 1 minute, the catalyst was flushed into the reactor with 150 ml of isobutane to give a total isobutane volume of 1.3 liters. Ethylene was allowed to feed into the reactor to maintain 335 psi. The reaction was terminated by stopping the ethylene feed and venting the reactor. Reactivities were calculated based on grams polymer recovered in one hour/grams of catalyst weight. Melt index (MI, grams/10 minutes.) and high load melt index (HLMI, grams/10 minutes) measurements were made using ASTM method D1238–86.

Comparison of catalysts 13 and 14 show that TBOS works equally well as TEOS. In addition, catalysts 13 and 14 also show that the amount of HMDS used to treat the silica can be reduced from 20 to 12 wt % and the type of silica can be varied from 948 to XPO.

Dombro Catalyst Synthesis (CE1):

704° C. dried 948 silica/0.65 mM BEM/0.16 mM Si(OEt)$_4$/0.65 mM TiCl$_4$

About 20 grams of Davison 948 silica was placed in a 1 inch diameter quartz glass tube equipped with a glass frit. The silica was fluidized with a stream of $N_2$ and placed in a vertical tube furnace. The silica was heated to 704° C. over 6 hours, held at 704° C. for 6 hours, and cooled to room temperature over 6 hours.

The catalyst was prepared in a three-neck round bottom flask with a paddle-type stirrer. All glassware was oven dried and assembled hot under a nitrogen purge. The left and right joints were fitted, respectively, with a nitrogen source and a vent to a mineral oil bubbler. The vent was also used to add the ingredients and to remove the finished catalyst. The glassware was purged for about 1 hr. prior to starting the catalyst synthesis. 4.805 grams of the 948 silica was added to the flask followed by about 40 ml of heptane and the slurry was stirred at about 160 rpm. 4.73 ml of a 0.66 M butylethylmagnesium (BEMg) in heptane was added by syringe. After 30 minutes, 0.77 ml of a 1.0 M solution of Si(OEt)$_4$ in heptane was added. After 30 minutes, 3.12 ml of a 1.0 M solution of TiCl$_4$ in heptane was added. After 30 minutes, the heptane was distilled off with a sweep of $N_2$ at 100° C.

Mink Catalyst Synthesis (CE2):

948 silica/3.67 mM TEA/0.7 mM BEM/0.17 mM Si(OEt)$_4$/0.7 mM TiCl$_4$

The method used for treating silica with triethylaluminum is described by A. Noshay and F. J. Karol in "Transition Metal Catalyzed Polymerizations Ziegler-Natta and Metathesis Polymerizations" Cambridge University Press, New York, N.Y., edited by R. P. Quirk, 1988, pp. 396–416.

The catalyst was prepared in a three-neck round bottom flask with a paddle-type stirrer. All glassware was oven dried and assembled hot under a nitrogen purge. The left and right joints were fitted, respectively, with a nitrogen source and a vent to a mineral oil bubbler. The vent was also used to add the ingredients and to remove the finished catalyst. The glassware was purged for about 1 hr. prior to starting the catalyst synthesis. 10.236 grams of Davison 948 silica was added. The flask was purged for 30 minutes and about 80 ml of heptane was added. The slurry was stirred at about 160 rpm. 24.1 ml of a 1.56 M triethylaluminum solution in heptane was added. After 30 minutes, the slurry was warmed to 40° C. 10.86 ml of a 0.66 M butylethylmagnesium in heptane was added. After 30 minutes, 1.74 ml of a 1.0 M solution of Si(OEt)$_4$ in heptane was added. After 30 minutes, 7.16 ml of a 1.0 M solution of TiCl$_4$ in heptane was added. After 30 minutes the temperature was increased to 55° C. and the heptane was distilled off with a sweep of $N_2$.

CE1 (Dombro) and CE2 (Mink) showed lower $H_2$ response, lower reactivity and lower polymer bulk density than the inventive catalysts 1 and 2. CE1 showed lower comonomer response, CE2 produced a density similar to catalysts 1 and 2 but produced a polymer with a broader molecular weight distribution than catalysts 1 and 2.

II. Scale-up catalysts—Inventive catalyst 15:

HMDS 948/0.65 mM BEM/0.16 mM Si(OEt)$_4$/0.65 mM TiCl$_4$

A steel reactor was purged for 6 hrs with $N_2$. HMDS Davison 948 silica that was dried at 150° C. was added and the stirrer was started at 100 rpm. 5 lbs. of heptane/lb. of silica was added and the slurry was stirred for 30 minutes.

The appropriate amount of butylethylmagnesium (10% in heptane) was added and the slurry was stirred for 30 minutes. The appropriate amount of Si(OEt)$_4$ (5% in heptane) was added and the slurry was stirred for 30 minutes. The appropriate amount of TiCl$_4$ (10% in heptane) was added and the slurry was stirred for 30 minutes. The catalyst was dried at 99° C. with a sweep of N$_2$.

Dombro Catalyst Synthesis (CE3):

700 dried 948/0.65 mM BEM/0.16 mM Si(OEt)$_4$/0.65 mM TiCl$_4$

A 5 gallon steel reactor was purged for 6 hrs with N$_2$. 2 lbs. of 700° C. dried Davison 948 silica was added and the stirrer was started at 100 rpm. 10 lbs. of heptane was added and the slurry was stirred for 30 minutes. 1.43 lbs. of butylethylmagnesium (10% in heptane) was added and the slurry was stirred for 30 minutes. 1.33 lbs. of Si(OEt)$_4$ (5% in heptane) was added and the slurry was stirred for 30 minutes. 2.47 lbs. of TiCl$_4$ (10% in heptane) was added and the slurry was stirred for 30 minutes. The catalyst was dried at 99° C. with a sweep of N$_2$. A second preparation of this catalyst was made following the same procedure called CE3–2.

Mink Catalyst Synthesis (CE4):

948 silica/3.67 mM TEA/0.7 mM BEM/0.17 mM Si(OEt)$_4$/0.7 mM TiCl$_4$

Glassware was oven dried and purged with N$_2$ for 1 hour. 250 g undried 948 silica was charged to a 3 liter round bottom reaction flask. The flask was purged with N$_2$ for 1 hour with stirring at about 100 rpm and 500 ml hexane was added. 582 ml of 25% triethylaluminum in heptane was added. After 30 minutes, the slurry was heated to 40° C. 275 ml of butylethylmagnesium (10% in

TABLE 1

| Catalyst | MI | MIR | density | Reactivity | ER | Bulk density |
|---|---|---|---|---|---|---|
| 1 | .80 | 29.6 | .9219 | 2234 | .86 | .422 |
| 2 | .75 | 29.6 | .9202 | 1937 | 1.0 | .422 |
| 3 | .65 | 31.8 | .9206 | 2979 | .90 | .423 |
| 4 | .89 | 32.6 | .9218 | 2606 | 1.0 | .376 |
| 5 | .56 | 33.4 | .9168 | 1493 | 1.0 | .386 |
| 6 | .75 | 33.6 | .9164 | 2139 | .98 | .396 |
| 7 | .70 | 27.0 | — | 682 | — | — |
| 8 | .40 | 27.5 | .9366 | 295 | — | — |
| 9 | .70 | 24.0 | .9365 | 1762 | .73 | — |
| 10 | 1.19 | 27.2 | — | 1144 | — | — |
| 11 | 1.78 | 27.3 | — | 2480 | .77 | — |
| 12 | 1.19 | 25.2 | — | 1058 | .83 | — |
| 13 | .57 | 25.3 | .9221 | 1751 | .72 | — |
| 14 | .55 | 25.2 | .9274 | 1777 | — | — |
| CE1 | .38 | 29.7 | .9251 | 558 | 1.0 | .332 |
| CE2 | .34 | 28.2 | .9220 | 266 | .92 | .325 | heptane) was added. After 30 minutes, 9.5 ml of Si(OEt)$_4$ was added. After 30 minutes, 19.5 ml of TiCl$_4$ was added. After 30 minutes, the slurry was heated to 55° C. and the catalyst was dried with a stream of N$_2$. A total of three batches of this catalyst was prepared and blended together for testing.

Gas-phase Fluidized Bed Polymerizations:

Gas-Phase polymerizations were carried out as described in U.S. Pat. Nos. 4,001,382 and 4,302,566.

The reaction temperature used was 180° F. with a fluidized velocity of 1.7 ft/sec. The ethylene, hydrogen and hexene concentrations were adjusted to produce a target polymer with a 0.915 g/cc density and a 1.0 melt index.

TABLE 2

| Catalyst | Productivity | MI | density | ER | Mole % ethylene | Mole % hydrogen | Mole % hexene |
|---|---|---|---|---|---|---|---|
| 15 | 6100 | 1.16 | .915 | .71 | 28.3 | 5.8 | 5.8 |
| CE3 | 1900 | 1.35 | .925 | 1.24 | 28.0 | 5.4 | 6.8 |
| CE3-2 | 1100 | 1.11 | .926 | — | 27.0 | 5.8 | 7.0 |
| CE4 | 300 | .80 | .926 | 1.29 | 28.0 | 5.4 | 6.8 |

Inventive catalyst 15 showed good catalyst activity and good comonomer response as well as narrow molecular weight distribution. CE3 (Dombro) and CE4 (Mink) catalysts had poor catalyst productivity and such poor density response that the target products could not be produced. A new batch of CE3 (Dombro) catalyst was made to verify the results from the first batch. Once again hexene response and catalyst productivity were very poor.

EXAMPLE 2

In this example, the melt elastic properties of the ethylene copolymer resin of the present invention were compared with prior art ethylene copolymers. Both the powder and pelletized forms were investigated. Other pertinent physical data are also reported herein and compared to commercial ethylene copolymer resins.

In this example, all the resins were prepared using a gas-phase fluidized bed polymerization process like the one described in Example 1. Resins 1–4 and 10–11 represent prior art or commercial resins; whereas resins 5–9 represent resins of the present invention.

Resins 1 and 4 were prepared from a standard polymerization catalyst using a gas phase process; resins 2 and 3 were prepared using a conventional catalyst such as described in U.S. Pat. No. 4,374,753 to Pullukat, et al. and resins 10–11 are commercially available high performance hexene LLDPE resins.

Resins 5–6, which represent the present invention, were prepared from a catalyst system which contained silica/MAGALA/butanol/TiCl$_4$ as the solid catalyst component and DIPS as a cocatalyst modifier.

Resins 7–9, which also represent the present invention, were prepared using a catalyst similar to catalyst 10 of Example 1.

The properties of each resin determined using the techniques defined hereinabove are reported in Table 3 and are graphically illustrated in FIGS. 1–6.

Figure 5:
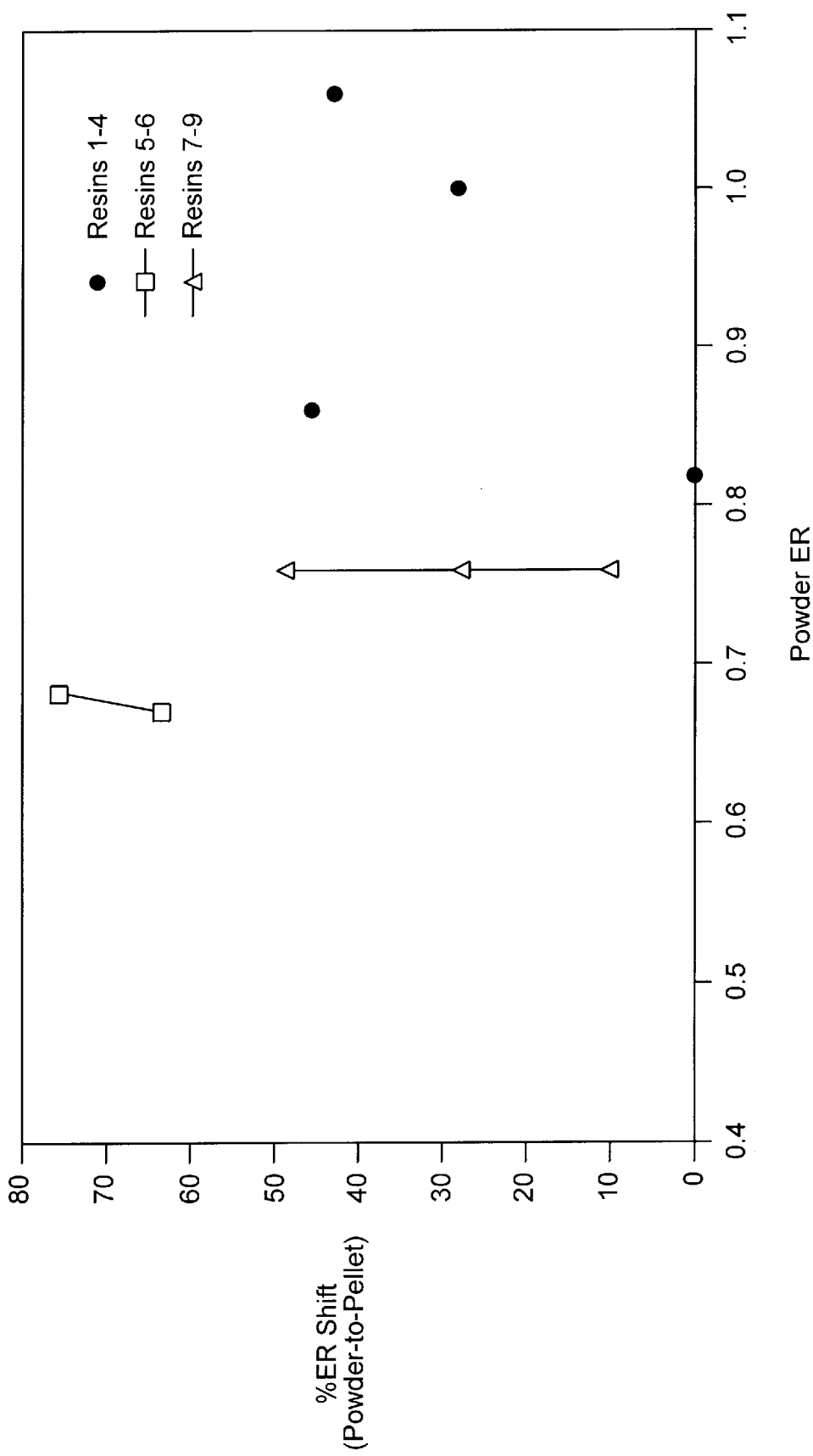
FIG. 5 is a graph of %ER shift(powder-to-pellet) vs. powder ER for various catalyst systems.

As shown in FIGS. 1–4, the resins of the present invention typically have higher impact, more rubber phase and smaller interparticle rubber distance than prior art resins. of significance is that the ethylene copolymer resins of the present invention, resins 5–9, exhibited the unique melt elastic properties mentioned above, whereas prior art resins 1–4 and 10–11 did not exhibit the unique melt elastic properties. Specifically, as shown in FIG. 5, the powder form of resins 5–9 all have ER values of 0.9 or below which undergo an increase in ER when pelletizing the powder.

Unlike the resins of the present invention, prior art resins 1–4 and 10–11 do not exhibit the same. Instead, when an increase in ER value from powder to pellet is observed, prior art powders had an initial ER value of greater than 0.8 (i.e. ER>0.8, if % ER shift was greater than 0), or when the prior art powder ER is 0.8 or below, the prior art resins did not exhibit an increase in ER in going from the powder to the pellet, (i.e. % ER shift=0, if ER is 0.8 or less).

Figure 6:
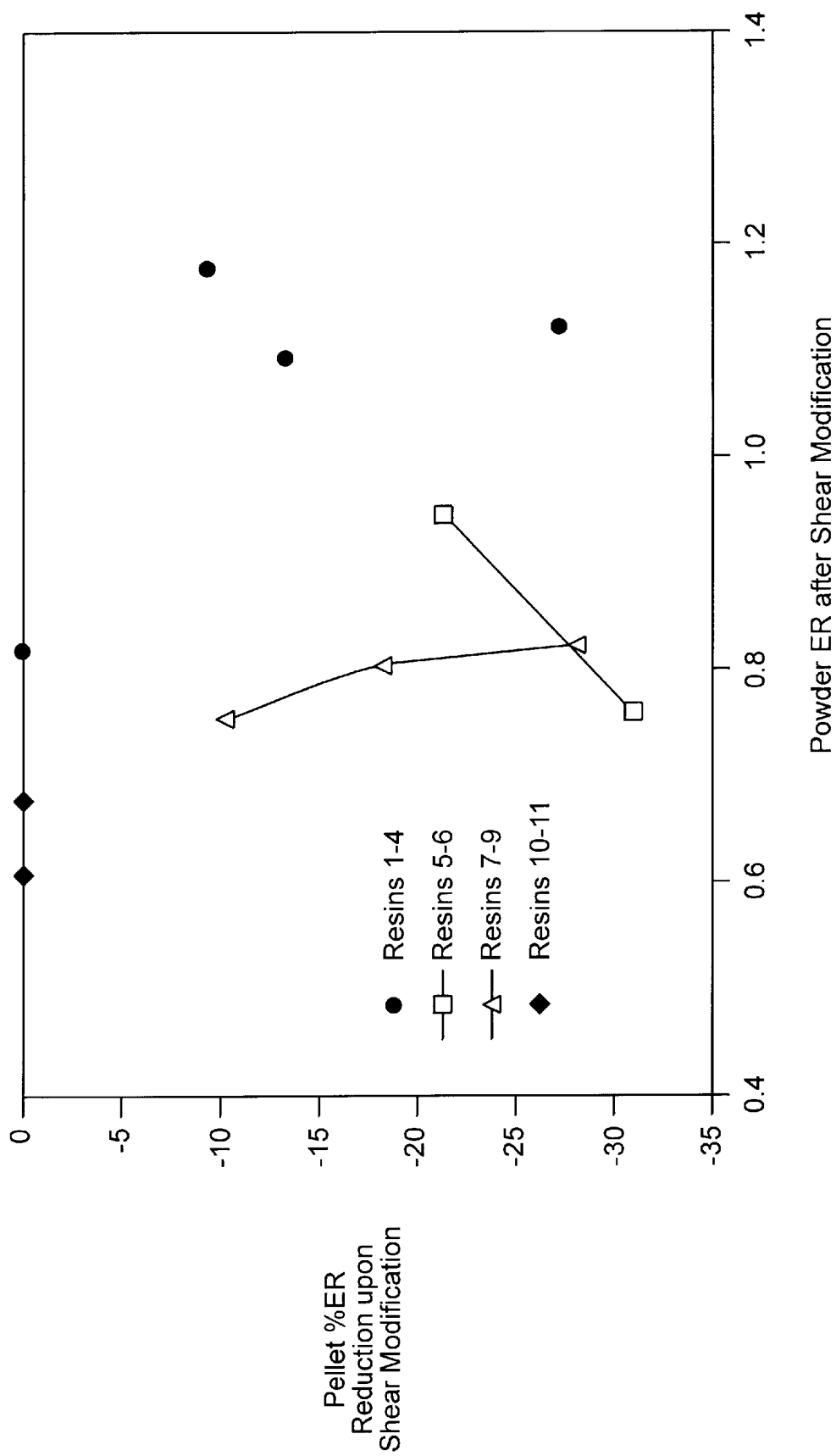
FIG. 6 is a graph of pellet %ER reduction upon shear modification vs. pellet ER after rheometric shear modification for various catalyst systems.

In addition to the above melt elastic properties, the inventive resins exhibited the melt elastic properties shown in FIG. 6. Specifically, the pelletized forms of resins 5–9 exhibited a 10–30% reduction in ER to values below 1.0 after rheometric low shear modification.

In contrast thereto, prior art pelletized samples had ER>1.0, if % ER shift reduction was less than 0, or they had % ER shift reduction=0, if ER was is less than 1.0.

Another important property of the resins of the present invention is that an increase in ER is observed in going from the powder to the pellet. This increase is almost completely reversible when the pellet is dissolved in xylene (See, Table 4). In the case of prior art resins, the ER values remained unchanged when going from pellet to solution dissolved pellet.

a Group 13 metal-containing compound in a heptane slurry at a temperature of 25° C. over a period of 30 minutes, in those examples where that step was conducted. A summary of the catalysts so synthesized appear below in Table 5.

TABLE 5

| Catalyst No. | Gp 13 Metal Compd, mmol/gm. silica |
|---|---|
| 15[1] | Triethylborane, 1.3 |
| 16[1] | None |
| 17[2] | Triethylborane, 1.3 |
| 18[2] | None |

TABLE 3

LIST OF RESIN AND FILM DATA

| Resin | Melt Index | Density | Film Impact | % Rubber (SEM) | ER, Powder | ER, pellet | ER-Shift, % | ER-After Shear modification | ER-Shear Mod., % | MD-Tear, g/mil | Modulus, Ksi |
|---|---|---|---|---|---|---|---|---|---|---|---|
| 1 | 1.0 | 0.918 | 188 ± 15 | 2.7 ± 0.7 | 0.82 | 0.82 | N/A | 0.82 | 0.0 | 335 ± 40 | 29.0 ± 1.0 |
| 2 | 0.7 | 0.9163 | 266 ± 28 | 9.3 ± 5.1 | 1.0 | 1.3 | 30 | 1.18 | −9 | 245 ± 7 | 31.0 ± 1.0 |
| 3 | 0.7 | 0.9146 | 356 ± 13 | 12.5 ± 2.0 | 1.06 | 1.54 | 45 | 1.12 | −27 | 265 ± 7 | 30.0 ± 0.7 |
| 4 | 0.9 | 0.915 | 336 ± 6 | 5.0 ± 1.5 | 0.86 | 1.26 | 47 | 1.10 | −13 | 320 ± 14 | 28.0 ± 0.9 |
| 5 | 1.0 | 0.917 | 355 ± 56 | 18.7 ± 1.0 | 0.68 | 1.2 | 76 | 0.25 | −21 | 339 ± 8 | 28.0 ± 1.0 |
| 6 | 0.75 | 0.9155 | 590 ± 85 | 23.1 ± 3.6 | 0.67 | 1.1 | 64 | 0.76 | −31 | 366 ± 17 | 27.6 ± 1.1 |
| 7 | 1.0 | 0.919 | 196 ± 9 | 5.1 ± 0.5 | 0.76 | 0.84 | 11 | 0.76 | −10 | 340 | 32.2 ± 1.0 |
| 8 | 1.0 | 0.917 | 331 ± 8 | 8.9 ± 1.8 | 0.76 | 0.98 | 29 | 0.80 | −18 | 355 ± 7 | 28.8 ± 0.7 |
| 9 | 1.0 | 0.915 | 602 ± 40 | 19.8 ± 2.0 | 0.76 | 1.14 | 50 | 0.82 | −28 | 380 ± 14 | 25.6 ± 0.2 |
| 10 | 0.95 | 0.917 | 476 ± 35 | 3.0 ± 1.0 | N/A | 0.68 | N/A | 0.68 | 0.0 | 420 ± 34 | 26.8 ± 1.1 |
| 11 | 1.1 | 0.917 | 462 ± 88 | N/A | N/A | 0.61 | N/A | 0.61 | 0.0 | 429 ± 31 | 25.7 ± 1.1 |

1. All films made under same conditions: 1 mil, 2.5 Blow-Up-Ratio, 150 lb/hr, 8" die, 100 mil die gap, dual lip air ring, 16" frostline height, 420° F. melt temperature, 3.5" extruder with a barrier screw and a Maddock mixing section.
2. All resin and film testing performed per standard ASTM procedures: D-1238 (Melt Index), D-2839 (Density), D-1709 (Film Impact/Free Falling Dart Drop), D-1922 (Tear) and D-882 (Modulus of Elasticity, 1% secant).
3. % Rubber determined by Scanning Electron Microscopy (SEM) on etched sections microtomed from melt-pressed pellets.
4. Rheometric shear modification performed as described herein for 60 minutes.

TABLE 4

Effect of Xylene Dissolution on ER

| | Resin 1 | Resin 11 | Resin 9 |
|---|---|---|---|
| Powder ER | 0.82 | N/A | 0.76 |
| Pellet ER | 0.82 | 0.59 | 1.14 |
| ER of Xylene Dissolved Pellet | 0.85 | 0.59 | 0.84 |

EXAMPLE 3

Ethylene polymerization catalysts were prepared according to the embodiment which includes a Group 13 metal-containing compound concluding contacting step. Eight catalysts, denoted as Catalysts 15–22, were prepared. All eight catalysts were prepared utilizing a Davison® 948 silica treated with HMDS in accordance with the procedure enumerated in Example 1. The so-treated silica supports were thereupon contacted with butylethylmagnesium (0.65 mmoles per gram silica); tetraethoxysilane (0.16 mmoles per gram silica); and titanium tetrachloride (0.65 mmoles per gram silica) in accordance with the method described in Example 1. The distinction in the eight catalysts involved the inclusion of a Group 13 metal-containing compounds contacting concluding step or the absence of that step.

Each supported catalyst, after contact with titanium tetrachloride, was contacted with the appropriate amount of TABLE 5-continued

| Catalyst No. | Gp 13 Metal Compd, mmol/gm. silica |
|---|---|
| 19[3] | Diethylaluminum chloride, 0.65 |
| 20[3] | Ethylaluminum dichloride, 0.65 |
| 21[3] | Triethylborane, 1.3 |
| 22[3] | None |

[1]Catalysts 15 and 16 were identical but for the inclusion of the triethylborane contacting step in the formation of Catalyst 15.
[2]Catalysts 17 and 18 were identical but for the inclusion of the triethylborane contacting step in the formation of Catalyst 18.
[3]Catalysts 19–22 were identical but for inclusion of the differing Group 13 metal-containing compound contacting steps in the formation of Catalysts 19–21.

EXAMPLE 4

Catalysts 15–22, synthesized in accordance with Example 3, were employed in gas phase polymerization reactions. Each of these polymerization reactions were conducted in a 3.3 liter vessel equipped with a helical agitator, a thermocouple and a valve for removing product polymer. The reactor was water jacketed in which the water was recirculated at a temperature of 82.2° C. Triethylamine (25 wt. % solution in heptane, 1 ml) was added to the reactor by syringe to a seed polymeric bed. Catalyst was added to the seed bed through a polyethylene tube. The agitator was activated and nitrogen gas (175 psi) was added. Thereupon, hydrogen gas (19.0 psi) and n-hexene (46 ml) were added to the reactor. Ethylene gas was added to bring the total pressure up to 300 psi. A mixture of 11.8 wt. % n-hexene in ethylene was fed into the reactor until the total ethylene feed into the reactor reached 300 grams at which time the n-hexene-ethylene feed was discontinued. The reactor was cooled and vented. About 335 gms. of polymeric product was removed from the reactor and the polymerization was repeated 3 times to remove the original polymeric seed bed. The fourth polymeric batch removed from the reactor is reported as the results of the polymerization.

The product ethylene-hexene copolymers were analyzed to determine their melt elasticities in accordance with the procedure provided in the aforementioned ASTM Test Procedure 4440-95a. The melt elasticity shift, determined by subjecting the polymeric melt to high shear, by passing the polymeric melt through an extruder, was next determined. In addition, the density of the polymer was determined in accordance with ASTM Test Procedure D-2389.

These examples, including the molar concentration of the hexene-1 comonomer, are summarized in Table 6.

TABLE 6

| Catalyst No. | Hexene in Copolymer, mole % | Polymer Density, g/cm³ | ER (Powder) | ER Pellet | ER, Shift, % |
|---|---|---|---|---|---|
| 15 | 3.73 | 0.919 | 0.88 | 1.29 | 46 |
| 16 | 3.53 | 0.918 | 0.83 | 1.03 | 24 |
| 17 | 3.50 | 0.918 | 0.81 | 1.35 | 67 |
| 18 | 3.30 | 0.919 | 0.83 | 1.05 | 26 |
| 19 | 4.10 | 0.918 | 0.95 | 1.49 | 57 |
| 20 | 3.97 | 0.918 | 1.07 | 1.67 | 56 |
| 21 | 4.00 | 0.918 | 0.90 | 1.35 | 50 |
| 22 | 3.80 | 0.917 | 0.83 | 1.07 | 29 |

DISCUSSION OF RESULTS OF EXAMPLE 4

The results of Example 4 emphasize the advantages obtained by utilizing the catalyst of the present invention in the polymerization of linear low density polyethylene. In that a major application of linear low density polyethylene is its use as a film, a major problem associated with the production of a successful LLDPE film, as in the case of all polymeric films, is significantly alleviated. That is, two desirable physical properties of any film, stiffness and impact strength, are difficult to optimize since an increase in one of these properties usually results in a decrease in the other.

Film stiffness, a property directly proportional to polymeric density, is desirably as high as possible. However, as is well known in the art, the greater the stiffness, the lesser is the impact strength of the film. The above suggested relationship that the greater the ER shift of a polymer, the greater the impact strength of a polymeric film formed from the polymer, however, can overcome this detriment.

It is useful to observe that the data bears out the proposition that polymeric ER shift is proportional to impact strength of a film formed of that polymer. Attention is directed to the data included in Table 3. Therein, Resins 3 and 4 have substantially the same density. As such, they have equal stiffness. They also share an almost identical ER shift percentage. As such, it is not surprising that the well established relationship that films of the same polymer having the same stiffness have the same impact strength is borne out by the film impact data wherein the impact strength of Resins 3 and 4 are substantially the same.

Another comparison taken from Table 3 further confirms this proposition. Resins 2 and 6 also have substantially the same density. However, the ER shift of Resin 6 is more than twice that of Resin 2. As established by the comparison between Resins 3 and 4, in the absence of a variation in ER shift, the two films should have substantially the same impact strength. However, the more than twice ER shift percentage of Resin 6 suggests that that resin has a higher impact strength compared to Resin 2. Indeed, this prediction, based on ER shift, is confirmed by the data. The impact strength of the film formed of Resin 6 is approximately twice that of the film made from Resin 2.

The comparison between two identical linear low density polyethylenes, e.g. ethylene-hexene copolymers, polymerized in the gas phase by identical ethylene polymerization catalysts but for the inclusion of the Group 13 metal compound contacting step, illustrate this advance. Catalyst 15, which included a final triethylborane contacting step in its formation, although possessing a substantially identical density, and thus a substantially identical stiffness, produced an ER shift double that obtained by Catalyst 16, the otherwise identical catalyst but for the inclusion of this inventive step. As such, Catalyst 15, within the scope of the present invention, produced a linear low density polyethylene having a higher impact strength than Catalyst 16, albeit the two catalyst possessed equivalent stiffness.

The same result was observed in the comparison between Catalyst 17, within the scope of the present invention, and Catalyst 18, which differed from Catalyst 17 only insofar as its synthesis did not include the Group 13 metal compound contacting step.

Catalysts 19–22 each produced LLDPE polymers having substantially identical densities. Thus, films formed from these polymers possessed substantially identical stiffness. However, the lowest melt elasticity shift was obtained by the LLDPE polymerized in the presence of Catalyst 22 which included no terminating Group 13 metal compound contacting step in its synthesis. Catalysts 19, 20 and 21 were synthesized with the inclusion of a concluding contacting step with three different preferred Group 13 metal compounds. In each case the ER shift of the polymers produced by these catalysts was significantly higher than the ER shift of the polymer produced in the polymerization catalyzed by Catalyst 22 which did not include a Group 13 metal-containing compound contacting step. As such, they produced films having significantly higher impact strength.

The above embodiments and examples are given to illustrate the scope and spirit of the present invention. These embodiments and examples will make apparent, to those skilled in the art, other embodiments and examples. These other embodiments and examples are within the scope of the present invention; therefore, the instant application should be limited only by the appended claims.

What is claimed is:

1. A catalyst system comprising
    (a) an ethylene polymerization catalyst prepared by steps comprising:
        (i) contacting a support with an organosilicon compound to effectuate reduction of surface hydroxyl group concentration of the support;
        (ii) contacting the support from step (i) with
            (A) a dialkylmagnesium compound or complex;
            (B) an alcohol; and
            (C) a transition metal compound;
            wherein steps (ii)(A), (ii)(B) and (ii)(C) are performed in an order selected from:
                (I) first (ii)(A), then (ii)(B), and then (ii)(C); or
                (II) first (ii)(A), then (ii)(C), and then (ii)(B); or (III) first (ii)(B), then (ii)(A), and then (ii)(C); and
(iii) contacting the product of step (ii) with a Group 13 metal-containing compound selected from the group consisting of triethylborane, diethylaluminum chloride and ethylaluminum sesquichloride;

(b) an aluminum-containing cocatalyst; and (c) a hydrocarbylalkoxysilane cocatalyst modifier.

2. The catalyst system of claim 1 wherein the support is selected from the group consisting of silica, alumina, aluminum phosphate, celite, magnesium oxide, iron oxide, and organic polymeric support.

3. The catalyst system of claim 1, wherein the support is silica.

4. The catalyst system of claim 1 wherein the organosilicon compound is selected from the group consisting of $(R_3Si)_2NH$, $R_3Si(OR)$, $R_3SiX$, and $(R_3Si)_2O$, wherein the R groups are the same or different and are selected from $C_1$ to $C_{20}$ alkyl and $C_6$ to $C_{20}$ aryl or aralkyl.

5. The catalyst system of claim 1 wherein the organosilicon compound is a hexaalkyl disilazane wherein the alkyl groups are the same or different and are selected from $C_1$ to $C_{20}$ alkyl.

6. The catalyst system of claim 1 wherein the organosilicon compound is hexamethyl disilazane.

7. The catalyst system of claim 1 wherein the alcohol is selected from $C_1$ to $C_{12}$ alcohols.

8. The catalyst system of claim 1 wherein the alcohol is n-butyl alcohol.

9. The catalyst system of claim 1 wherein the transition metal compound is selected from Group 4 or 5 transition metal compounds having a ligand selected from halogen, aryl, alkyl, aralkyl, cycloalkyl, and alkylsilyl.

10. The catalyst system of claim 1 wherein the transition metal compound is titanium tetrachloride or zirconium tetrachloride.

11. The catalyst system of claim 1 wherein the transition metal compound is titanium tetrachloride.

12. A catalyst system comprising (a) an ethylene polymerization catalyst prepared by steps comprising:
(i) contacting a silica support with a hexaalkyl disilazane to effectuate reduction of the surface hydroxyl group concentration of the support;
(ii) contacting the support from step (i) with
(A) a dialkylmagnesium compound or complex;
(B) n-butyl alcohol; and
(C) titanium tetrachloride;
wherein steps (ii)(A), (ii)(B) and (ii)(C) are performed in an order selected from:
(I) first (ii)(A), then (ii)(B), and then (ii)(C); or
(II) first (ii)(A), then (ii)(C), and then (ii)(B); or
(III) first (ii)(B), then (ii)(A), and then (ii)(C); and
(iii) contacting the product of step (ii) with a Group 13 metal-containing compound selected from the group consisting of triethylborane, diethylaluminum chloride and ethylaluminum sesquichloride;

(b) an aluminum-containing cocatalyst; and (c) a hydrocarbylalkoxysilane cocatalyst modifier.

* * * * *